(12) United States Patent
Wen et al.

(10) Patent No.: US 11,272,471 B2
(45) Date of Patent: Mar. 8, 2022

(54) METHODS, APPARATUS AND ELECTRONIC DEVICES FOR ABSOLUTE TIME SYNCHRONIZATION

(71) Applicant: Beijing University of Posts and Telecommunications, Beijing (CN)

(72) Inventors: Xiangming Wen, Beijing (CN); Chenyu Zhang, Beijing (CN); Wei Zheng, Beijing (CN); Zhaoming Lu, Beijing (CN); Zhengying Wang, Beijing (CN); Cong Li, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/061,358

(22) Filed: Oct. 1, 2020

(65) Prior Publication Data
US 2021/0243712 A1    Aug. 5, 2021

(30) Foreign Application Priority Data
Feb. 4, 2020    (CN) .......................... 202010079779.6

(51) Int. Cl.
*H04W 56/00*    (2009.01)
*H04J 3/06*    (2006.01)

(52) U.S. Cl.
CPC ....... *H04W 56/0015* (2013.01); *H04J 3/0682* (2013.01)

(58) Field of Classification Search
CPC ........... H04W 56/0015; H04W 56/001; H04W 56/0045; H04W 72/0446; H04W 72/0406; H04J 3/0682; H04J 3/0697
See application file for complete search history.

(56) References Cited

U.S. PATENT DOCUMENTS

| 2015/0381706 A1* | 12/2015 | Wohlert | .................. H04L 67/10 709/201 |
| 2016/0345281 A1* | 11/2016 | Murray | ............. H04W 56/0015 |
| 2019/0306821 A1* | 10/2019 | Hu | ......................... H04W 56/00 |

\* cited by examiner

*Primary Examiner* — Ricardo H Castaneyra
(74) *Attorney, Agent, or Firm* — Seed IP Law Group LLP

(57) ABSTRACT

Embodiments of the present disclosure disclose a method, an apparatus, and an electronic device for an absolute time synchronization, the method comprising: receiving, from a baseband processing chip, a first timing signaling and a first real system frame information of the received first timing signaling, the first timing signaling comprising a first absolute time corresponding to local time of a base station at time of transmission of the first timing signaling, and a first reference system frame information used by the base station for transmitting the first timing signaling; calculating a first time delay between the base station and the terminal based on at least the first absolute time, if the first real system frame information is consistent with the first reference system frame information; receiving, from the baseband processing chip, subsequent timing signalings and corresponding second real system frame information used by the base station for transmitting the subsequent timing signalings to the terminal, the subsequent timing signalings each comprising a second absolution time corresponding to the local time of the base station at time of transmission of the subsequent timing signaling and a second reference system frame information used by the base station for transmitting the subsequent timing signaling; for each of the subsequent timing signalings, determining a time delay adjustment value between the subsequent timing signaling and the first timing signaling based on at least the first time delay and the second absolute time, if the second real time system frame information is consistent with the second reference system frame information; and after a number of the received subsequent timing signalings reaches a target number, (Continued)

obtaining an absolute time information based on the time delay adjustment values corresponding to the target number of subsequent timing signaling; wherein the absolute time information is used to synchronize time of the terminal to time of the base station.

8 Claims, 4 Drawing Sheets

METHODS, APPARATUS AND ELECTRONIC DEVICES FOR ABSOLUTE TIME SYNCHRONIZATION

TECHNICAL FIELD

The present disclosure relates to the field of wireless communication technology, and in particular, to methods, apparatus, and electronic devices for absolute time synchronization.

BACKGROUND

According to the high Precision Timing Protocol (PTP protocol) proposed in the IEEE 1588v2 standard, in wired optical networks, timing accuracy of an order of 10 ns can be achieved using link symmetry. However, in current mobile networks, during communication between a terminal and a base station both uplink and downlink synchronization are based on relative time synchronization on basis of alignment of wireless frame/subframe boundaries instead of absolute time synchronization. Meanwhile, in mobile networks, performance of timing using a traditional NTP timing protocol or a PTP protocol degrades as a result of instability of air links etc.

In addition, although GNSS receiver-based positioning/timing methods have been widely used, it is generally applicable for unobstructed scenes. For indoor, tunnel, and underground scenes, the GNSS is not capable of timing or has poor accuracy. Furthermore, the GNSS is not capable of timing for scenes such as power grids due to its vulnerability to interferences.

SUMMARY

Embodiments of the present disclosure provide a method, an apparatus, and an electronic device for an absolute time synchronization.

An aspect of the present disclosure provides an absolute time synchronization method, wherein, the method is executed on a timing chip of a terminal in a mobile network, the method comprising:

receiving, from a baseband processing chip, a first timing signaling and a first real system frame information of the received first timing signaling; the first timing signaling comprising a first absolute time corresponding to local time of a base station at time of transmission of the first timing signaling and a first reference system frame information used by the base station for transmitting the first timing signaling;

calculating a first time delay between the base station and the terminal base on at least the first absolute time, if the first real system frame information is consistent to the first reference frame information, receiving, from the baseband processing chip, subsequent timing signalings and corresponding second real system frame information used by the base station for transmitting the subsequent timing signalings to the terminal; the subsequent timing signalings each comprising a second absolute time corresponding to the local time of the base station at time of transmission of the subsequent timing signaling, and a second reference system frame information used by the base station for transmitting the subsequent timing signaling;

for each of the subsequent timing signalings, determining the time delay adjustment value between the subsequent timing signaling and the first timing signaling based on at least the first time delay and the second absolute time, if the second real system frame information is consistent with the second reference frame information;

after a number of the received subsequent timing signalings reaches a target number, obtaining an absolute time information based on the time delay adjustment values corresponding to the target number of subsequent timing signalings; wherein, the absolute time information is used to synchronize time of the terminal to time of the base station.

It further comprises, receiving, from the baseband processing chip, a time advance adjustment value sent from the base station to the terminal; and obtaining a final time advance value between the base station and the terminal by adjusting a current time advance value according to the received time advance adjustment value.

It further comprises, setting the final time advance value between the base station and the terminal to zero, in response to a time advance value reset instruction received from the baseband processing chip; and/or resetting the first time-delay and waiting to receive a further first timing signaling from the baseband processing chip, in response to an ending instruction, which is used to terminate a current timing process, received from the baseband processing chip.

It comprises at least one of the followings:

discarding the first timing signaling and waiting to receive a further first timing signaling, or adjusting the first absolute time in the first timing signaling according to a time interval length between the first real system frame information and the first reference system frame information, if the first real time system frame information is inconsistent with the first reference system frame information;

discarding the subsequent timing signaling and waiting to receive a further subsequent timing signaling, or adjusting the second absolute time in the subsequent timing signaling according to a time interval length between the second real system frame information ad the second reference system frame information, if the second real time system frame information is inconsistent with the second reference system frame information;

Wherein, the first time delay is determined using the following formula: first time delay=reference terminal time—first absolute time—uplink time advance value—hardware processing delay; wherein, the uplink time advance value is determined based on the final time advance value, and the hardware processing delay is related to the delay in transmitting and/or processing the first timing signaling within the terminal; and the terminal reference time is zero or is terminal local time; and/or, the time delay adjustment value is determined using the following formula: time delay adjustment value=terminal reference time—first time delay—second absolute time—uplink time advance value—hardware processing delay; the terminal reference is zero or is local time of the terminal; and/or, the absolute time information comprises a third absolute time, which is determined using the following formula: third absolute time=$\Sigma$ delay adjustment value i/target number+ first time delay; wherein, the delay adjustment value i is the time delay adjustment value corresponding to the i-th subsequent timing signaling, and the value of i ranges from 1 to the target number.

Wherein, after determining a time delay adjustment value between the subsequent timing signaling and the first timing signaling based on at least the first time delay and the absolute time, the method further comprising, determining a processing manner of the time delay adjustment value of the subsequent timing signaling based on a current state of a virtual state machine and whether the time delay adjustment value of the subsequent timing signalings is less than a first jitter threshold and/or a second jitter threshold;

wherein, the virtual state machine comprises an initial state, a first state and a second state;

the virtual state machine is in the initial state at startup;

in the initial state, the received timing signaling is processed as the first timing signaling, and after processing the first time signaling, the virtual state machine enters the first state;

in the first state, after receiving a subsequent timing signaling, the virtual state machine enters the second state;

in the second state, if the currently received subsequent timing signaling is greater than or equal to the second jitter threshold, the subsequent timing signaling is discarded and the virtual state machine transfers to the first state; and in the first state, if the time delay adjustment value of the discarded subsequent timing signaling is greater than or equal to the first jitter threshold, the virtual state machine enters to the initial state.

Another aspect of the present disclosure provides an absolute time synchronization method, wherein, the method is executed on a timing chip of a terminal in a mobile network;

performing a first timing signaling processing step, comprising:

receiving, from the baseband processing chip, a first timing signaling and a first real system frame information used by the base station for transmitting the first timing signaling to the terminal; wherein, the first timing signaling comprises a first absolute time corresponding to the local time of the base station at time of transmission of the first timing signaling, and the first reference system frame information used by the base station for transmitting the first timing signaling;

calculating an initial time delay adjustment value between the base station and the terminal based on at least the first absolute time, if the first real system frame information is consistent with the first reference system frame information;

starting the virtual state machine, which enters the initial state of the virtual state machine; wherein, in the initial state, the first time delay between the base station and the terminal is determined as the initial time delay adjustment value, and a total time delay adjustment value is set to zero, and then the virtual state machine enters the first state.

performing a subsequent timing signaling processing step, comprising: receiving, from the baseband processing chip, a subsequent timing signalings and a second real system frame information for transmitting the subsequent timing signaling from the base station to the terminal, wherein the subsequent timing signaling comprises a second absolute time corresponding to the local time of the base station at time of transmission of the subsequent timing signaling, and a second reference system frame information used by the base station for transmitting the subsequent timing signaling;

determining a time delay adjustment value between the subsequent timing signaling and the first timing signaling based on at least the first time delay and the second absolute time, if the second real system frame information is consistent with the second reference system frame information;

adding 1 to a number of the received subsequent timing signalings, and enabling the virtual state machine to move to a second state; the current state comprising the first or the second state;

wherein;

in the second state, if the time delay adjustment value of the subsequent timing signalings is greater than or equal to the second jitter threshold, the number of the subsequent timing signaling is decreased by 1, and the current state of the virtual state machine moves from the second state to the first state;

after moving from the second state to the first state, if the time delay adjustment value of the subsequent timing signaling is greater than or equal to the first jitter threshold, the number of the subsequent timing signalings is reset to 0, the first time delay is reset to 0, and the current state of the virtual state machine moves from the first state to the initial state, first timing signaling processing step is performed;

after moving from the second state to the first state, if the time delay adjustment value of the subsequent timing signalings is less than the first jitter threshold, the total time delay adjustment value is increased by a weighted value of the time delay adjustment value, which is less than the time delay adjustment value, and if the number of subsequent timing signalings is less than a target number, the subsequent timing signaling processing step is performed, and if the number of subsequent timing signaling is equal to the target number, an absolute time information outputting step is performed;

in the second state, if the time delay adjustment value of the subsequent timing signaling is less than the second jitter threshold, the total time delay adjustment value is increased by the time delay adjustment value of the subsequent timing signaling, and the number of the subsequent timing signalings is increased by 1, and if the number of subsequent timing signalings is less than the target number, the subsequent timing signaling processing step is performed, and if the number of the subsequent timing signalings is equal to the target number, the absolute time information outputting step is performed:

the absolute time information outputting step comprises: determining an absolute time information based on the total time delay adjustment value, and the number of the subsequent timing signalings and the first time delay and outputting the absolute time information which is used to synchronize time of the terminal to time of the base station.

In the third aspect, the present disclosure provides a mobile terminal, comprising: a baseband processing chip and a timing chip; the baseband processing chip receives a timing signaling from a base station via an air interface, and forwards to a timing chip the received timing signaling as well as a real system frame information used by the base station for transmitting the received timing signalings to the terminal;

the baseband processing chip receives a current time advance value from the base station and forwards the current time advance value to the timing chip;

based on at least the timing signaling received from the baseband processing chip, the real system frame information and the current time advance value, the timing chip outputs an absolute time information for the terminal to adjust the terminal reference time; wherein, the timing chip determines the absolution time information using the method described in the first aspect.

In the fourth aspect, the present discourse provides an absolute time synchronization apparatus arranged in a timing chip of a terminal in a mobile network, the apparatus comprising, a first receiving means configured for receiving, from the baseband chip, a first timing signaling and a first real system frame information of the received timing signaling; the first timing signaling comprising a first absolute time corresponding to local time of a base station at time of transmission of the first timing signaling and a first reference system frame information used by the base station for transmitting the first timing signaling;

a computational means configured for calculating a first time delay between the base station and the terminal based on at least the first absolute time, if the first real system frame information is consistent with the first reference system frame information;

a second receiving means configured for receiving, from the baseband processing chip, subsequent timing signalings and corresponding second real system frame information used by the base station for transmitting the subsequent timing signalings to the terminal, the subsequent timing signalings each comprising a second absolution time corresponding to the local time to the base station at time of transmission of the subsequent timing signaling, and a second reference system frame information used by the base station for transmitting the subsequent timing signaling;

a determining means configured for each of subsequent timing signalings, determining a time delay adjustment value between the subsequent timing signaling and the first timing signaling, based on at least the first time delay and the second absolute time, if the second real system frame information is consistent with the second reference frame information.

an obtaining means configured for, after a number of the subsequent timing signaling reaches a target number, obtaining the absolute time information base on the time delay adjustment value corresponding to the subsequent timing signalings, wherein, the absolute time information is used to synchronize time of the terminal to time of the base station.

Described functions can be implemented by hardware, or by hardware executing the corresponding software. The hardware or software comprise one or more means corresponding to the above functions.

In a possible design, structure of an absolute time synchronization apparatus comprises a memory and a processor, wherein, the memory is configured for storing one or more computer instructions, which support the absolute time synchronization apparatus to execute the instructions of described methods according to any one of aspects above, the processor is configured for executing the computer instructions stored in the memory. The absolute time synchronization apparatus also comprises a communication interface to communicate with other devices or communication networks.

In a fifth aspect, the present disclosure provides an electronic device, comprising a memory and a processor; wherein, the memory is configured for storing one or more computer instructions, which, when being executed by the processor, causes the processor to implement the method according to any one of above aspects.

In a sixth aspect, the present disclosure provides a computer-readable storage medium for storing computer instructions used in any one of above apparatuses, comprising the computer instructions used to implement the method according to any one of the above aspects.

The present disclosure provides technical solutions that may comprise the following beneficial effects:

In order to achieve a low-cost, low-overhead, high-precision wireless time synchronization capability for mobile network wireless timing scenarios, the present disclosure implements an absolute time synchronization based on an air interface physical layer signal through wireless communication network to send from the base station the absolute time information to the terminal and to receive and adjust the time by the terminal, etc.

It should be understood that the above general description and the detailed description later are merely illustrative and explanatory, and do not limit the present disclosure.

BRIEF DESCRIPTION OF THE DRAWINGS

Other features, objects and advantages of the present disclosure will become more apparent from the detailed description of the exemplary embodiments with reference to the drawings. In the drawings.

DETAILED DESCRIPTION

Figure 1:
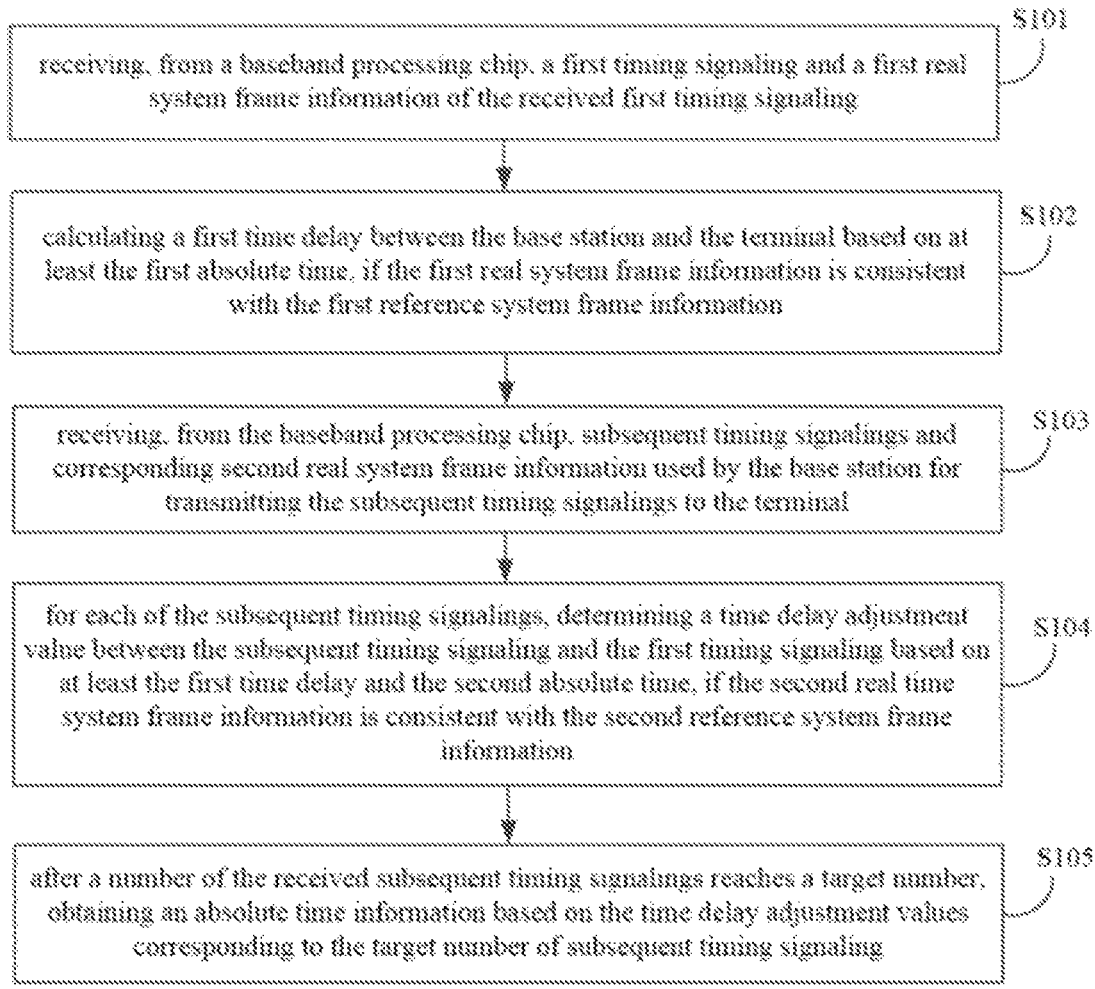
FIG. 1 shows a flowchart of an absolute time synchronization method according to an embodiment of the present disclosure.

Hereinafter, exemplary embodiments of the present disclosure will be described in details with reference to the accompanying drawings so that those of ordinary skilled in the art can easily implement these embodiments. Further, portions that are not related to the description of the exemplary embodiments are omitted in the drawings for the sake of clarity.

In the present disclosure, it is to be understood that the terms such as "comprising", or "having" are intended to indicate the presence of features, numbers, steps, acts, components, parts or combinations thereof. The possibility of the presence or addition of a plurality of other features, numbers, steps, acts, components, parts or combinations thereof is not excluded.

It should also be noted that the embodiments of the present disclosure and the features of the embodiments may be combined with each other without conflict. Next, the present disclosure will be described in details with reference to the drawings and embodiments.

As described above, in current wireless communication network, uplink and downlink synchronization between a terminal and a base station during wireless communication is based on relative time synchronization of alignment of wireless frame/subframe boundaries, i.e., the base station and the terminal are only capable of the relative time synchronization instead of absolute time synchronization. None of relevant technologies for designing base station time synchronization and network time synchronization have proposed how to provide high-precision timing to terminals in mobile network wireless scenarios. In order to achieve a low-cost, low-overhead, and high-precision wireless time synchronization capability for mobile network wireless timing scenarios, the present disclosure implements an absolute time synchronization based on an air interface physical layer signal. The present disclosure relates to transmitting absolute time information from the base station to the terminal, which receives the absolute time information and adjusts the time, etc.

Details of embodiments of the present discourse are described with reference to specific examples as below.

FIG. 1 shows a flow chart of an absolute time synchronization method according to an embodiment of the present disclosure. As shown in FIG. 1, the absolute time synchronization method comprises:

In step S101, receiving, from a baseband processing chip, a first timing signaling and a first real system frame information of the received first timing signaling, the first timing signaling comprising a first absolute time corresponding to local time of a base station at time of transmission of the first timing signaling and a first reference system frame information used by the base station for transmitting the first timing signaling;

In step S102, calculating a first time delay between the base station and the terminal based on at least on the first absolute time, if the first real system frame information is consistent with the first reference system frame information;

In step S103, receiving, from the baseband processing chip, subsequent timing signalings and corresponding second real system frame information used by the base station for transmitting the subsequent timing signalings to the terminal, the subsequent timing signalings each comprising a second absolute time corresponding to the local time of the base station at time of transmission of the subsequent timing signaling and a second reference system frame information used by the base station for transmitting the subsequent timing signaling;

In step S104, for each of subsequent timing signalings, determining a time delay adjustment value between the subsequent timing signaling and the first timing signaling based on at least the first time delay and the second absolute time, if the second real system frame information is consistent with the second reference frame information;

In step S105, after a number of the received subsequent timing signalings reaches a target number, obtaining an absolute time information based on the time delay adjustment values corresponding to the target number of subsequent timing signalings, wherein the absolute time information is used to synchronize time of the terminal to time of the base station.

In the embodiment of the present discourse, the absolute time synchronization method is executed on a timing chip of the terminal in a mobile network. An air interface connection is established between the base station and each of one or more terminals within a coverage area of the base station, i.e., communication of the base station and the terminal is performed via air interface. Compared to the prior art, the embodiment of the present discourse has an ability to issue absolute time via physical layer signaling at the base statin side. At the terminal side, by opening baseband module capability, physical layer data including SIB (System Information Block, air interface physical message) timing signaling and Time Advance (TA) received and demodulated by the baseband processing chip via the air interface physical layer is output to the timing chip of the terminal. The timing chip processes the received physical layer data and outputs a local absolute time information and a frequency reference signal 1 pps of the terminal, and the terminal adjusts a terminal reference time according to the absolute time information and the frequency reference signal 1 pps outputted by the timing chip.

Figure 2:
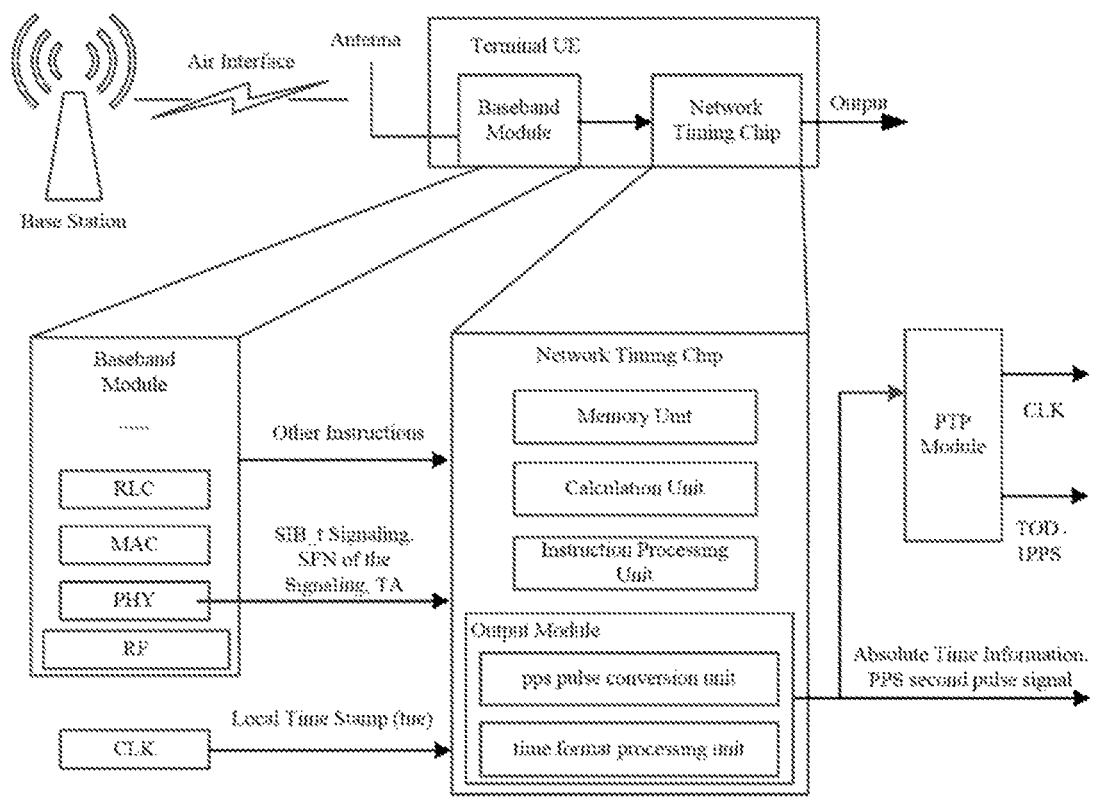
FIG. 2 shows a schematic diagram of an architecture of a timing service via an air interface in a mobile network according to an embodiment of the present disclosure.

FIG. 2 shows a schematic diagram of an architecture of timing service via an air interface in a mobile network according to an embodiment of the present disclosure. As shown in FIG. 2, a base station sends a timing signaling SIB to a terminal UE through a physical layer of an air interface established between the base station and the terminal. A baseband module (including a baseband processing chip) of the terminal UE forwards the received physical layer data including SIB signaling to the timing chip. The timing chip processes the physical layer data and outputs absolute time information, which comprises absolute time and frequency reference signal pps. The terminal can adjust time of the terminal based on the absolute time and the frequency reference signal, so that the time of the terminal is synchronized with time of the base station.

As shown in FIG. 2, the terminal comprises the baseband module (including the baseband processing chip) and a timing chip. The baseband module receives signals from the base station through an antenna and a radio frequency circuit, and if the received signals comprise the SIB timing signaling, directly forwards the physical layer data, on which the timing signaling is carried, to the timing chip for processing. At the meantime, the baseband module forwards a real system frame information (including a system frame number) SFN corresponding to the timing signaling to the timing chip. In addition, if signals received by the baseband module from the base station comprises a time advance value TA, the baseband module forwards the TA to the timing chip as well.

The timing chip comprises a memory unit, a calculation unit, an instruction processing unit, and an outputting unit. The outputting unit comprises a conversion unit for a frequency reference signal, e.g., a pps second pulse signal, and a time format procession unit. The timing chip stores data, which is received from the baseband module, in the memory unit, uses the instruction processing unit to execute computer instructions, and uses the computation unit to calculate to obtain the absolute time based on the received timing signaling from the baseband processing chip, the real system frame information corresponding to the timing signaling, the TA, and the terminal reference time (local time stamp CLK or 0), etc. A 1 pps second pulse reference signal is obtained by using a pps pulse conversion unit in the outputting unit. Absolute time of a variety of formats can be obtained using the time format processing unit. The timing chip can output the absolute time and the 1 pps second pulse signal to a PTP (Precision Time Protocol) module of the terminal. The PTP module outputs a terminal local time in accordance with the IEEE 1588 by using the absolute time.

The timing signaling received by the baseband processing chip from the base station comprises an absolute time information corresponding to local time of the base station at time of transmitting the timing signaling, and a reference system frame information corresponding to the timing signaling. In some embodiments, the absolute time information in the timing signaling may comprise a starting moment of a time slot, in which the timing signaling is located during transmission. The reference system frame information in the timing signaling is a system frame number used by the base station for transmitting the timing signaling. If retransmission of ARQ/HARQ does not occur, the reference system frame information is the same as a real system frame information when the terminal receives the timing signal. However, if retransmission of ARQ/HARQ occurs, it may cause retransmission of the timing signaling, so that the real system frame information received by the terminal when the terminal receives the timing information is inconsistent with the reference system frame information in the timing signaling. In such a case, the absolute time of the timing signaling is not the starting moment when the base station actually sends the timing signaling. Therefore after the terminal receives the timing signaling, it firstly compares the reference system frame information with the real system frame information. If the reference system frame information is consistent with the real system frame information, it means the timing signaling is valid, the terminal can determine a time error between the base station and the terminal based on the first absolute time information in the timing signaling. If the reference system frame information is inconsistent with the real system frame information, the timing signaling can be simply considered to be invalid and can be discarded instead of being used to determine the time error between the base station and the terminal according to this timing signaling and the timing signaling is not used for adjusting local time of the terminal. Otherwise, the timing signaling is still considered to be valid, but the absolute time information in the timing signaling requires to be adjusted according to a time error between the reference system frame information and the real system frame information, so that the absolute time information is adjusted to the starting moment when the base station actually sends the timing signaling.

The baseband module can communicate with the timing chip through interfaces such as serial port/PCI-E/M.2. The baseband module is able to modulate and demodulate signals, and can be implemented with a 3GPP-compliant baseband processing chip. The timing chip comprises a memory unit, a computation unit and an instruction processing unit.

The timing signaling is a physical layer signal. After receiving, from the base station, scheduling instructions including a time-frequency resource block used for issuing the timing signaling, the baseband processing chip waits, on the time-frequency resource block, to receive the timing signaling issued by the base station. After receiving the timing signaling, the baseband processing chip forwards the demodulated physical layer data directly to the timing chip. The absolute time information can be obtained and output by the timing chip according to the first absolute time information, the terminal reference time, and the time advance value between the base station and the terminal, etc. The terminal adjusts its local time according to the absolute time information output by the timing chip in order to synchronize the local time of the terminal to the local time of the base station.

The terminal is connected to the base station via an air interface. The base station estimates the time advance value (Time advance, TA) between the base station and the terminal in real time according to the 3GPP standard process, and sends the TA to the baseband processing chip of the terminal via the air interface. Each of the received time advance values is forwarded to the timing chip by the baseband processing chip. When the time advance value TA is required to be re-adjusted at the terminal, in cases of switching the base station etc., the timing chip is informed to clear stored TA.

Before timing starts, corresponding parameters of the timing chip can be configured by the baseband module. The configured parameters, which can determine the way in which the terminal receives the timing signalings, comprise the following parameters:

Nu: a target number of received valid timing signalings SIB_t;

Th0: it can be understood as a tolerance threshold of a channel delay jitter in a short period of time. During one timing service, the base station can transmit more than one timing signaling to the terminal, and a time interval between transmission of the timing signalings is fixed. After the received timing signalings are processed by the timing chip, if a time delay adjustment value of a subsequent timing signaling relative to a first timing signaling exceeds Th0, it is possible that due to an error of the first time delay obtained based on the first timing signaling or an instability of a current channel, a time delay jitter may be too large for the timing service, so the timing service can be terminated and the timing signaling is to be re-received.

Th1: it can be understood as another tolerance threshold of the channel delay jitter in a short period of time. During one timing service, the base station can transmit more than one timing signaling to the terminal, and the time interval between the transmission of the timing signalings is fixed. After the received timing signalings are processed by the timing chip, if the time delay adjustment value of a subsequent timing signaling relative to the first timing signaling exceeds Th1, it is possible that due to a temporary instability of the current channel, the time delay jitter may be too large for the timing service, so the timing service can be paused and a current timing signaling can be discarded. Then a next received timing signaling is processed.

In some embodiments, Th0 is greater than Th1, and above parameters can be configured as: Nu=150; Th0=50 us; Th1=10 us. It should be noted that the value of Nu is less than an actual number of timing signalings transmitted by the base station in a single timing service.

Since the timing signaling is an air-port physical layer signal, the baseband processing chip receives and demodulates the physical layer data, which comprises the timing signaling, and then forwards the demodulated data directly to the timing chip.

In one timing service, the base station can transmit generated timing signalings to each of the terminals, which need to perform timing, in a broadcast manner. The terminals may be all or some of the terminals within coverage area of the base station. In the broadcast manner, a time-frequency resource block Rb used by the base station is the same for all terminals performing timing. The time-frequency resource block Rb can be pre-set, which can reduce expense of system scheduling signaling. Therefore, the timing signaling sent to each terminal in this way can be the same, wherein the absolute time information can include a starting moment of a time slot in which the timing signaling is located during transmission. After receiving the timing signaling, a time error between local time of the base station and local time of the terminal can be determined by the terminal, according to the absolute time information and the time advance value TA between the base station and the terminal measured in advance and sent to the terminal by the base station. Then the local time of the terminal is adjusted according to the time error, to synchronize the time of the terminal to that of the base station.

In one timing service, the base station can transmit the timing signalings to each of the terminals, which need to perform timing, in a unicast manner. The terminals may be all or some of the terminals within the coverage area of the base station. In the unicast manner, different time-frequency resource blocks Rbs can be used for different terminals for flexibility. Therefore, the timing signaling sent in this means to each terminal can be the same or different.

In some embodiments, the absolute time information in the timing signaling may comprise a starting moment of a time slot in which the timing signaling is located during transmission. After receiving the timing signaling, the time error between the local time of the base station and the local time of the terminal can be determined by the terminal, according to the absolute time information and the time advance value TA between the base station and the terminal measured in advance and sent to the terminal by the base station. Then the local time of the terminal is adjusted according to the time error, to synchronize the time of the terminal to that of the base station. In other embodiments, the absolute time information in the timing signaling may comprise a starting moment of a time slot in which the timing signaling is located during transmission, plus a time advance value between the base station and the terminal. The time advance value TA between the base station and the terminal can be an estimate of a time delay without granularity processing, which is obtained after the base station blindly defects the terminal's uplink pre-codes by using a 3GPP standard procedure. Since the time delay estimation between the base station and the terminal has been taken into account, after receiving the timing signaling, the local time of the terminal can be directly adjusted, according to the time error between the absolute time information and the local time of the terminal, to synchronize the time of the terminal to that of the base station.

Once one timing service of the base station starts (the bast station will periodically perform the timing service, and send a plurality of timing signalings to the terminal at a fixed time interval length during each timing service), the timing chip processes a timing signaling, which is the first one timing signaling received from the baseband processing chip, as the first timing signaling. If the first timing signaling is valid (e.g., if the first real system frame information is consistent with the first reference system frame information), the timing signaling which is subsequently received is processed as the subsequent timing signaling.

The process for the first timing signaling differs from that for the subsequent timing signaling, as explained in detail below.

Every time the baseband processing chip receives a timing signaling, it forwards the timing signaling and a system frame number (i.e. the real system frame information) of the received timing signaling to the timing chip. After receiving the first timing signaling and its corresponding first real system frame information, the timing chip first compares whether the first reference system frame information in the first timing signaling is consistent with the first real system frame information. If the first reference system frame information in the first timing signaling is in consistent with the first real system frame information, it means that, for this first timing signaling, the system frame sent by the base station is inconsistent with the system frame received by the terminal, then one of the following two processes can be adopted.

In a first process, the first timing signaling is discarded and the terminal waits to receive the first timing signaling again. In a second process, the first absolute time in the first timing signaling is adjusted according to a time interval length between the first real system frame information and the first reference system frame information. That is, in the first process, the first timing signaling is determined to be invalid and the terminal waits to receive a next timing signaling, which is then processed as the first timing signaling. In the second process, a time error between the first reference system frame information and the first real system frame information is determined according to the system frame length. After the time error is added to the first absolute time in the first timing signaling, the first timing signaling is determined to be valid and processed.

After determining the valid first timing signaling by the timing chip using the above process, the first time delay between the base station and the terminal is calculated based on at least the first absolute time.

In some embodiments, the first time delay may be determined using the following formula: first delay=terminal reference time—first absolute time—uplink time advance value—hardware processing delay, wherein, the terminal reference time in the above formula may be 0, or may be the local time of the terminal obtained from a local time stamp output by a clock unit at the terminal. The local time of the terminal is current time when the first timing signaling is processed by the timing chip. When the terminal reference time is 0, the timing chip finally outputs the absolute time information, which can be used to adjust the terminal time directly to synchronize the time of the terminal to that of the base station. When the terminal reference time is the local time of the terminal, the timing chip finally outputs a time adjustment value, which is used to adjust the terminal local time to synchronized the time of the terminal to that of the base station.

The hardware processing delay is related to a delay of transmitting and/or processing of the first timing signaling within the terminal, and can be measured in advance. The hardware processing delay can be a delay required for the baseband processing chip to demodulate and transmit the first timing signaling to the timing chip and for the timing chip to process the first timing signaling to a current state. The uplink advance value is determined based on a final time advance value, for example a half of the final time advance.

In an alternative embodiment of the present disclosure, the absolute time synchronization method also comprises:

receiving, from the baseband processing chip, a time advance adjustment value sent from the base station to the terminal; and obtaining a final time advance value between the base station and the terminal by adjusting a current time advance value according to the received time advance adjustment value.

The base station can measure the time advance value TA between the base station and the terminal in a manner specified in a 3GPP standard process and sends the measured TA to the terminal. If the terminal position changes, the base station re-measures a TA and sends a TA adjustment value to the terminal. The baseband processing chip on the terminal forwards this TA to the timing chip. The timing chip stores each received TA in the memory unit. The final time advance value is a sum of the time advance values sent by the base station and can be expressed as follows.

$$TA_{total} = TA_{RA} + \sum_i TA_i$$

wherein, $TA_{total}$ is the final time advance value; $TA_{RA}$ is a time advance value (TimeAdvance, TA) obtained during a random access, $TA_i$ is the TA adjustment value received during the course of the service.

After processing the first timing signaling, the timing chip waits to receive a next timing signaling. A valid timing signaling received after the first timing signaling is determined as a subsequent timing signaling. The subsequent timing signaling is similar to the first timing signaling and comprises a second absolute time information corresponding to the local time of the base station at time of sending this subsequent timing signaling and a second reference system frame information corresponding to the subsequent timing signaling. The timing chip compares the second reference system frame information in the subsequent timing signaling with the second real system frame information received from the baseband processing chip. If the second reference system frame information in the subsequent timing signaling is consistent with the second real system frame information received from the baseband processing chip, the timing chip will continue to process the subsequent signaling, and if they are inconsistent, one of following two processes can be performed.

In a first process, the subsequent timing signaling is discarded and the terminal waits to receive the subsequent timing signaling again, if the second reference system frame information is consistent with the second real system frame information. In a second process, a second absolute time in the subsequent timing signaling is adjusted according to a time interval length between the second real system frame information and the second reference system frame information. That is, in the first process, the subsequent timing signaling is determined to be invalid and the terminal waits to receive a next timing signaling In the second process, similarly to the processing of the first timing signaling, a time error between the second reference system frame information and the second real system frame information is determined according to the system frame length. After the time error is added to the second absolute time in the subsequent timing signaling, the subsequent timing signaling is determined to be valid and processed.

For each of the subsequent timing signalings, a time delay adjustment value between the subsequent timing signaling and the first timing signaling is determined based on at least the first time delay and the second absolute time.

In some embodiments, the time delay adjustment value may be determined using the following formula: time delay adjustment value=terminal reference time—first time delay—second absolute time—uplink time advance value—hardware processing delay, wherein, the terminal reference time in the above formula may be 0, or may be the local time of the terminal obtained from a local time stamp output by a clock unit at the terminal. The local time of the terminal is current time when the subsequent timing signaling is processed by the timing chip. When the terminal reference time is 0, the timing chip finally outputs the absolute time information, which can be used to adjust the terminal time directly to synchronize the time of the terminal to that of the base station. When the terminal reference time is the local time of the terminal, the timing chip finally outputs a time adjustment value, which is used to adjust the terminal local time to synchronized the time of the terminal to that of the base station.

The hardware processing delay is related to a delay of transmitting and/or processing of the subsequent timing signaling within the terminal, and can be measured in advance. The hardware processing delay can be a delay required for the baseband processing chip to demodulate and transmit the subsequent timing signaling to the timing chip and for the timing chip to process the subsequent timing signaling to a current state. The uplink advance value is determined based on a final time advance value, for example a half of the final time advance.

Operation parameters of the timing chip can be preconfigured by the baseband processing chip. The operation parameters comprise at least a target number Nu, a first jitter threshold Th0 and a second jitter threshold Th1. After a number of valid subsequent timing signalings received by the timing chip reaches the target number, an absolute time information including a third absolute time can be obtained based on the time delay adjustment value corresponding to the target number of subsequent time signalings and the first time delay. This absolute time information can be output to the PTP module to adjust the time of the terminal to synchronize the time of the terminal to the time of the base station.

In some embodiments, the third absolute time may be determined using the following formula.

Third absolute time=$\Sigma$ time delay adjustment value i/target number+first time delay, wherein, the time delay adjustment value i is the time delay adjustment value corresponding to the i-th subsequent timing signaling, and the value of i ranges from 1 to the target number. The third absolute time is an average of the time delay adjustment value i of the target number of the subsequent timing signalings plus the first time delay.

In an alternative embodiment, the absolute time synchronization method also comprises:

setting the final time advance value between the base station and the terminal to zero in response to a time advance value reset instruction received from the baseband processing chip; and/or, resetting the first time delay and waiting to receive a further first timing signaling from the baseband processing chip, in response to an ending instruction of the current timing process, which is used to terminate the current timing process, received from the baseband processing chip.

In this alternative embodiment, the base station measures the time advance between the terminal and the base station in real time and sends the adjustment value of the time advance to the terminal. When the time advance value is required to be re-adjusted at the terminal, in cases of switching the base station etc., the baseband processing chip will inform the timing chip to set the stored final time advance to zero.

In some embodiments, if multiple timing signalings sent by the base station cannot meet a timing condition set by a current timing chip due to the instability of the current channel delay or other reasons, the timing chip receives, from the baseband processing chip, the ending instruction of the current timing process, which is used to terminate the current timing process. Upon receiving the ending instruction of the current timing process, the timing chip resets the first time delay and waits to receive a further first timing signaling from the baseband processing chip, i.e., waits for the base station to initiate a further timing service.

In an alternative embodiment, in step S104, after determining the time delay adjustment value between the subsequent timing signaling and the first timing signaling based on at least the first time delay and the second absolute time, the absolute time synchronization method also comprises:

determining a processing manner of the time delay adjustment value of the subsequent timing signaling based on a current state of a virtual state machine, and whether the time delay adjustment value of the subsequent timing signaling is within the first jitter threshold and/or the second jitter threshold;

wherein:

the virtual state machine includes an initial state, a first state, and a second state;

the virtual state machine is in the initial state at startup;

in the initial state, the received timing signaling is processed as the first timing signaling, and after processing the first timing signaling, the virtual state machine enters the first state;

in the first state, after receiving a subsequent timing signaling, the virtual state machine enters the second state;

in the second state, if the time delay adjustment value of the currently received delay adjustment value of the subsequent timing signaling is greater than or equal to the second jitter threshold, the subsequent timing signaling is discarded and the virtual state machine transfers to the first state; and in the first state, if the time delay adjustment value of the discarded subsequent timing signaling is greater than or equal to the first jitter threshold, the virtual state machine enters the initial state.

In this alternative embodiment, the virtual state machine may be used to filter for valid subsequent timing signalings as well as determine the state after respective process. The virtual state machine includes the initial state, the first state and the second state, Wherein:

the virtual state machine is in the initial state at startup;

after calculating a first time delay based on the received first timing signaling by the timing chip, the virtual state machine enters the initial state;

in the initial state, the first time delay in this timing service is recorded and a total cumulative value of the time delay adjustment value of the subsequent timing signalings is initialized to zero, then the virtual state machine enters the first state and waits to receive a further timing signaling;

in the first state, after calculating a corresponding time delay adjustment value of the received subsequent timing signaling, a valid number of the subsequent timing signalings is increased by 1, and the virtual state machine enters the second state;

after moving to the second state from the first state, if the time delay adjustment value of the subsequent timing signaling exceeds (that is, becomes greater than or equal to) the second jitter threshold Th1, it means that the channel jitter is large at time of transmission of the subsequent timing signaling, so that this timing service is paused, the terminal waits for a further timing signaling, the valid number of the subsequent timing signalings is decreased by 1 (i.e. the current subsequent timing signaling is determined to be invalid), and the virtual state machine enters the first state from the second state;

after moving to the first state from the second state, if the current time delay adjustment value of the subsequent timing signaling exceeds the first jitter threshold Th0 (the first jitter threshold is greater than the second jitter threshold), the first time delay can be considered to be wrong or the instability of the current channel causes a too large delay jitter, the timing service needs to be terminated, and the virtual state machine enters the initial state.

An absolute time synchronization method according to another embodiment of the present disclosure comprises the following steps:

performing a first timing signaling processing step, comprising: receiving, from the baseband chip, a first timing signaling and a first real system frame information used by the base station for transmitting the first timing signaling to the terminal, wherein the first timing signaling comprises a first absolute time corresponding to local time of the base station at time of transmission of the first timing signaling and a first reference system frame information used by the base station for transmitting the first timing signaling;

calculating an initial time delay adjustment value between the base station and the terminal based on at least the first absolute time, if the first real system frame information is consistent with the first reference system frame information;

starting a virtual state machine, which enters an initial state of the virtual state machine, wherein, in the initial state, a first time delay between the base station and the terminal is determined as the initial time delay adjustment value, and a total time delay adjustment value is set to zero, and then the virtual state machine enters a first state;

performing a subsequent timing signaling processing step, comprising: receiving, from a baseband processing chip, a subsequent timing signaling and a second real system frame information used by the base station for transmitting the subsequent timing signaling to the terminal, wherein, the subsequent timing signaling comprises a second absolute time corresponding to local time of the base station at time of transmission of the subsequent timing signaling and a second reference system frame information used by the base station for transmitting the subsequent timing signaling;

determining a time delay adjustment value between the subsequent timing signaling and the first timing signaling based on at least the first time delay and the second absolute time, if the second real system frame information is consistent with the second reference system frame information;

entering the virtual state machine and adding 1 to a number of the received subsequent time signalings, and enabling the virtual state machine to move from the current state to a second state; wherein the current state comprises the first or second state;

wherein, in the second state, if the time delay adjustment value of the subsequent timing signaling is greater than or equal to the second jitter threshold, the number of the subsequent timing signalings is decreased by 1, and the current state of the virtual state machine moves from the second state to the first state;

after moving from the second state to the first state, if the time delay adjustment value of the subsequent timing signaling is greater than or equal to the first jitter threshold, the number of the subsequent timing signalings is reset to 0, the first time delay is reset to 0, and the current state of the virtual state machine moves from the first state to the initial state and performs the above first timing signaling processing step;

after moving from the second state to the first state, if the time delay adjustment value of the subsequent timing signaling is less than the first jitter threshold, the total time delay adjustment value is increased by a weighted value of the time delay adjustment value which is less than the time delay adjustment value, and if the number of subsequent timing signalings is less than a target number, the subsequent timing signaling processing step is performed, and if the number of the subsequent time signals is equal to the target number, an absolute time information outputting step is preformed; and in the second state, if the time delay adjustment value of the subsequent timing signaling is less than the second jitter threshold, the total time delay adjustment value is increased by the time delay adjustment value of the subsequent timing signaling, and the number of subsequent timing signalings is increased by 1, and if the number of subsequent timing signaling is less than the target number, the subsequent timing signaling receiving processing step is performed, and if the number of subsequent timing signalings is equal to the target number, the absolute time information outputting step is performed;

an absolute time information outputting step comprises: determining an absolute time information based on the total time delay adjustment, the number of subsequent timing signalings and the first time delay, and outputting the absolute time information, which is used to synchronize time of the terminal to time of the base station.

In this embodiment, the absolute time synchronization method is performed in the timing chip of the terminal in the mobile network. An air interface connection is established between the base station in the mobile network and one or more terminals within the coverage area of the base station, i.e., communication between the base station and the terminal is established via the air interface. Compared to the prior art, the present disclosure adds on the base station side the ability to issue the absolute time information via the physical layer. On the terminal side, by opening the baseband capability, the baseband processing chip receives through the air interface physical layer and demodulates the physical layer data including SIB (System Information Block, air interface physical layer data), timing signalings and Time Advance (TA), then outputs the physical layer data to the timing chip of the terminal. The timing chip processes the received physical layer data, then outputs the local absolute time information and a frequency reference signal pps of the terminal. The terminal adjusts time of the terminal to synchronize the time of the terminal to time of the base station according to the absolute time and the frequency reference signal pps outputted by the timing chip.

Figure 3:
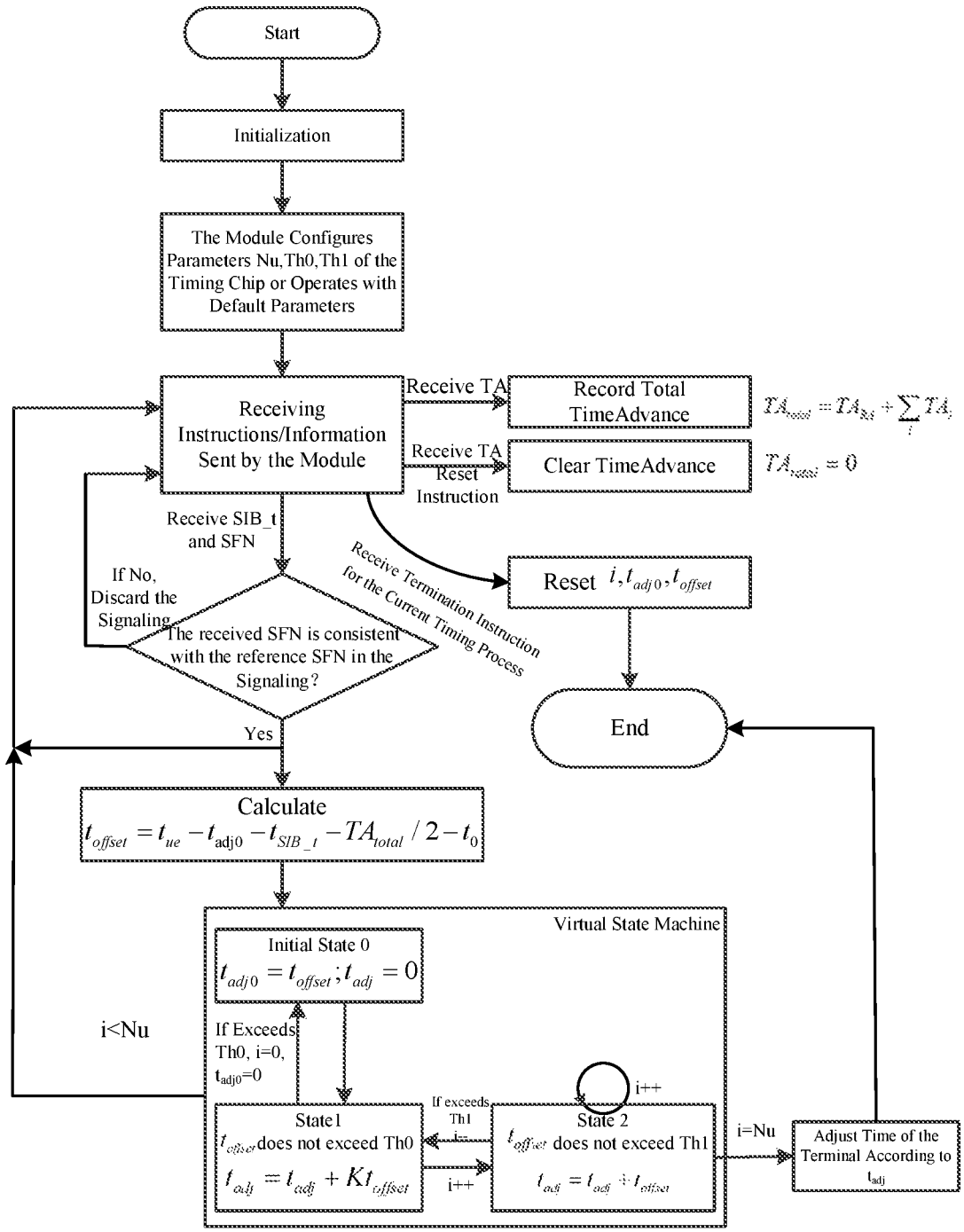
FIG. 3 shows a schematic flow of implementation of an absolute time synchronization method according to an embodiment of the present disclosure.

FIG. 3 illustrates a schematic flow diagram of a specific implementation of an absolute time synchronization method in accordance with an embodiment of the present disclosure. As shown in FIG. 3, the timing chip records a final time advance $TA_{total}$, which is used to indicate that the timing chip accumulates all the Time Advance results sent by the baseband processing chip and calculated by the Time Advance Command according to a 3GPP standard process, i.e., $$TA_{total} = TA_{RA} + \sum_i TA_i$$

$TA_{RA}$ is the TA obtained during random access. $TA_i$ is the TA adjustment value received during the course of the service, which is used as an estimation value of an uplink time delay. The value t0 is a time delay of data transmission and processing of the hardware including the baseband module and the timing chip etc., i.e. the hardware processing delay described in the previous embodiment. The value t0 needs to be measured in advance since it varies for different hardware although it is relatively fixed. If Nb timing signalings sent by the base station cannot meet a timing condition set by a current chip due to instability of a current channel time delay, the baseband module sends the timing chip an ending instruction, which is used to terminate a current timing process.

The timing chip judges and calculates according to the input SFN (the real system frame information corresponding to timing signalings) and SIB_t signaling (i.e. timing signalinging): if the SFN does not match the SFN in the signaling, discarding the current timing signaling and waiting to receive and process a further timing signaling; for a valid timing signaling, the calculation of $t_{offset}$ is based on the following formulation in FIG. 3. ($t_{offset}$ is the first time delay for the first timing signaling, $t_{offset}$ is the time delay adjustment value for subsequent timing signalings).

$$t_{offset} = t_{ue}t_{adj0}t_{SIB\_t} - TA_{total}/2 - t_0;$$

wherein, $t_{ue}$ is a terminal reference time, which can be 0, $t_{adj0}$ is a first time delay, $t_{SIB\_t}$ is an absolute time information in the timing signaling (a first absolute time information for a first timing signaling and a second absolute time information for a subsequent timing signaling), $TA_{total}$ is a final time advance value between the base station and the terminal, $t_0$ is a transmission time delay of the hardware.

The timing chip determines the processing manner for $t_{offset}$ according to a current state of the virtual state machine (0~2, i.e., initial state 0, state 1, state 2), comprising:

after entering the default initial state 0, resetting $t_{adj}$ (a cumulative value of the time delay adjustment of the subsequent timing signalings), $t_{adj0} = t_{offset}$ (i.e. the first time delay, which is calculated for the first timing signaling, the initial value of $t_{adj0}$ is 0), and then jumping to the state 1;

in the first state, starting an accumulation of $t_{adj}$ (when moving from the initial state 0 to state 1, no operation is performed, and when moving from the state 2 to state1, $t_{adj}$ is accumulated by a time delay adjustment value, which is a product of a coefficient K and a delay adjustment value of the discarded subsequent timing signaling, for the purpose of fine-tuning a time delay jitter accumulation value to stabilize a channel delay). The coefficient K is determined by a specific deployment environment and is taken in a range of [0,1]. A transferred state is determined by Th0.

when moving from state 1 or state 2 to state 2, a valid subsequent timing signaling count i is increased by 1 and $t_{adj}$ is accumulated (i.e., a time delay adjustment value of this valid subsequent timing signaling is accumulated to a cumulative value of the time delay jitter), and a transferred state is determined by Th1;

when transferring from state 2 to state 1 (i.e., if a time delay adjustment value corresponding to a current subsequent timing signaling exceeds a second threshold Th1, it is considered that a large jitter of the channel delay may occur and state 2 is paused), a valid subsequent timing signaling count is decreased by 1;

if a total number of input valid subsequent timing signaling i is less than a target number Nu set by the timing chip, the timing chip continues to receive and process the subsequent timing signalings; if i is equal to Nu, the timing chip outputs an absolute time information and a 1 pps second pulse signal according to $t_{offset}$, terminates the current timing processing and waits for a next timing processing. The time of the terminal is adjusted as follows: $t_{adj}/N_u + t_{adj0}$. It should be noted that, if $t_{ue} = 0$ and $t_{adj}/N_u t_{adj0}$ negative, a clock of the terminal can be adjusted from 0:00 by an absolute value of $t_{adj}/N_u + t_{adj0}$.

Other details in this embodiment can be found in the description of the absolute time synchronization method in the previous embodiment, and will not be repeated here.

A terminal according to an embodiment of the present disclosure comprises a baseband processing chip and a timing chip. The baseband processing chip receives a timing signaling via an air interface from the base station, and forwards to the timing chip the received timing signaling as well as a real system frame information used by the base station for transmitting the timing signaling to the terminal. The baseband processing chip also receives a current time advance value from the base station, and forwards the received current time advance value to the timing chip.

Based on at least a received timing signaling from the baseband processing chip, the real system frame information, and the current time advance, the timing chip outputs an absolute time information, which is used by the terminal to adjust time of the terminal, wherein, the timing chip determines the absolute time information using the absolute time synchronization method described above.

Followings are embodiments of the disclosed apparatus that may be used to implement method embodiments of the present disclosure.

According to an embodiment of the present disclosure, an absolute time synchronization apparatus, which can be implemented by software, hardware, or a combination of both, is a part or a whole of an electronic device. The absolute time synchronization apparatus comprises:

a first receiving means configured for receiving, from the baseband processing chip, a first timing signaling and a first real system frame information of the received first timing signaling; the first timing signaling comprising a first absolute time corresponding to local time of the base station at time of transmission of the first timing signaling and the first reference system frame information used by the base station for transmitting the first timing signaling.

a calculating means configured for calculating a first time delay between the base station and the terminal based on at least the first absolute time, if the first real system frame information is consistent with the first reference system frame information.

a second receiving means configured for receiving, from the baseband processing chip, a subsequent timing signaling and a second real system frame information used by the base station for transmitting the subsequent time signal to the terminal, the subsequent timing signaling each comprising a second absolute time corresponding to local time of the base station at time of transmission of the subsequent time signal and a second reference system frame information used by the base station for transmitting the subsequent timing signaling a determining means configured for, for each subsequent timing signaling, determining a delay adjustment value between the subsequent timing signaling and the first timing signaling, based on at least the first time delay and the second absolute time, if the second real system frame information is consistent with the second reference system frame information.

an obtaining means configured for, after a number of received subsequent timing signaling reaches a target number, obtaining an absolute time information based on the time delay adjustment values corresponding to the target number of subsequent timing signaling; wherein the absolute time information is used to synchronize time of the terminal to time of the base station.

The absolute time synchronization apparatus in this embodiment is consistent with the absolute time synchronization method described above, and details can be found in above description of the absolute time synchronization method and will not be repeated herein.

Figure 4:
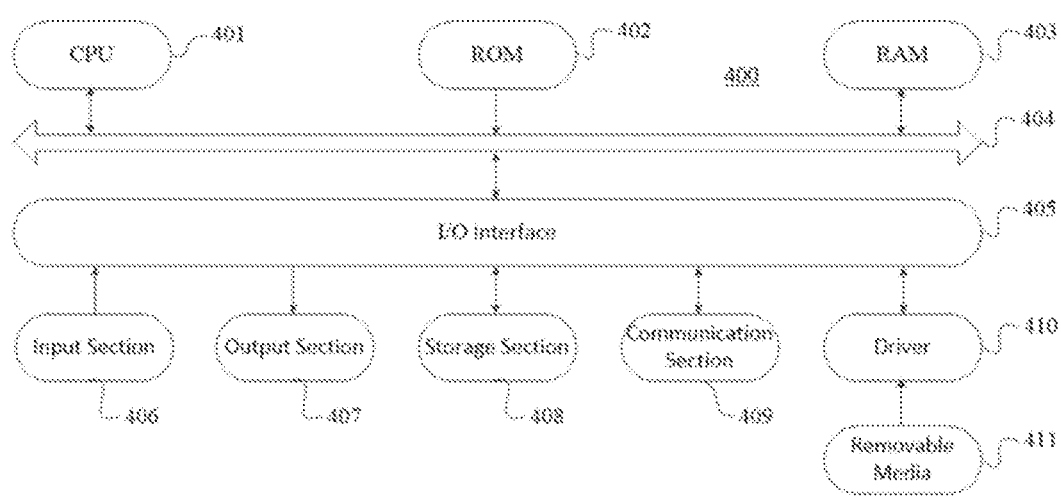
FIG. 4 shows a schematic diagram of a structure of an electronic device suitable for implementing an absolute time synchronization method according to an embodiment of the present disclosure.

FIG. 4 is a schematic diagram of a structure of an electronic device for executing an absolute time synchronization method according to embodiments of the present disclosure.

As shown in FIG. 4, an electronic device 400 comprising a processing unit 401 may be implemented as a CPU, GPU, FPGA, NPU, etc. According to a program stored in a read-only memory (ROM) 402 or a program loaded from a memory portion 408 to a random access memory (RAM) 403, the processing unit 401 performs various processing steps in embodiments of any one of above methods in the present disclosure. In the RAM 403, various programs and data required for operating the electronic device 400 are also stored. The CPU 401, the ROM 402 and the RAM 403 are connected to each other via a bus 404. An input/output (I/O) interface 405 is connected to the bus 404 as well.

Following components are connected to the I/O interface 405, comprising: an inputting section 406 including keyboards, mice, etc.; an outputting section 407 including cathode ray tubes (CRT), liquid crystal display (LCD), speaker, etc.; a storage section 408 including hard disk, etc.; and a communication section 409 in a network interface card 409 including a LAN card, modem, etc., The communication section 409 performs communication processing via a network such as Internet. As required, a driver 410 is also connected to the I/O interface 405. A removable media 411, such as disks, CDs, CD-ROMs, semiconductor memory, etc., is installed on the driver 410 so that computer programs can be easily to installed into the storage section 408 as required.

In particular, any methods above according to embodiments of the present disclosure may be implemented as a computer software program. For example, embodiments of the present disclosure comprise a computer program product, comprising a computer program which is tangibly contained on a readable medium and comprises a program code for executing any methods of the present disclosure. In such embodiments, the computer program can be downloaded and installed from a network via the communication section 409, and/or be installed from the removable media 411.

Flowcharts and block diagrams in the attachment illustrate architecture, functionality, and operation of possible implementations of systems, methods, and computer program products in accordance with various embodiments of the present disclosure. At this point, each block in flow charts or block diagrams may represent a module, a segment, or a portion of code that contains one or more executable instructions for implementing a specified logical function. It should also be noted that in some implementations as a replacement, functions labeled in the block may also be labeled in a different order from those labeled in drawings in the attachment. For example, two successively represented blocks can actually be executed roughly in parallel, and can also be executed in reverse order, depending on involved functions. It is also important to note that each and combinations of blocks in block diagrams and/or flowcharts, may be implemented with a dedicated hardware-based system which performs specified functions or operations, or may be implemented with a combination of dedicated hardware and computer instructions.

Units or modules described in the present disclosure embodiments may be implemented by means of software, or hardware. Described units or modules may also be located in processors, and under certain circumstances names of these units or modules do not constitute a limitation of the units or modules themselves.

As another aspect, the present disclosure also provides a computer-readable storage medium, which can be a computer-readable storage medium assembled in an apparatus described in methods; or can be a separate, computer-readable storage medium that is not assembled into the apparatus. The computer-readable storage medium stores one or more programs used by one or more processors to execute the methods described in the present disclosure.

The above description is only a preferred embodiment of the present disclosure and an illustration of the technical principles employed. It should be understood by those of skill in the art that the scope of the invention involved in the present disclosure is not limited to specific combinations of the above technical features of the technical solution, shall also cover other technical solutions resulting from any combination of the above technical features or their equivalents, without departing from the invention idea, for example, a technical solution formed by interchanging the above features with technical features having similar functions disclosed in the present disclosure but not limited thereto.

The invention claimed is:

1. An absolute time synchronization method, wherein the method is executed on a timing chip of a terminal in a mobile network, the method comprising:
receiving, from a baseband processing chip, a first timing signaling and a first real system frame information of the received first timing signaling, the first timing signaling comprising a first absolute time corresponding to local time of a base station at time of transmission of the first timing signaling, and a first reference system frame information used by the base station for transmitting the first timing signaling;
calculating a first time delay between the base station and the terminal based on at least the first absolute time, if the first real system frame information is consistent with the first reference system frame information;
receiving, from the baseband processing chip, subsequent timing signalings and corresponding second real system frame information used by the base station for transmitting the subsequent timing signalings to the terminal, the subsequent timing signalings each comprising a second absolute time corresponding to the local time of the base station at time of transmission of the subsequent timing signaling and a second reference system frame information used by the base station for transmitting the subsequent timing signaling;
for each of the subsequent timing signalings, determining a time delay adjustment value between the subsequent timing signaling and the first timing signaling based on at least the first time delay and the second absolute time, if the second real time system frame information is consistent with the second reference system frame information; and
after a number of the received subsequent timing signalings reaches a target number, obtaining an absolute time information based on the time delay adjustment values corresponding to the target number of subsequent timing signaling, wherein the absolute time information is used to synchronize time of the terminal to time of the base station.

2. The method according to claim 1, further comprising:
receiving, from the baseband processing chip, a time advance adjustment value sent from the base station to the terminal; and
obtaining a final time advance value between the base station and the terminal by adjusting a current time advance value according to the received time advance adjustment value.

3. The method according to claim 1, further comprising:
setting a final time advance value between the base station and the terminal to zero, in response to a time advance value reset instruction received from the baseband processing chip; and/or
resetting the first time delay and waiting to receive a further first timing signaling from the baseband processing chip, in response to an ending instruction, which is used to terminate a current timing process, received from the baseband processing chip.

4. The method according to claim 1, further comprising at least one of the followings:
discarding the first timing signaling and waiting to receive a further first timing signaling, or adjusting the first absolute time in the first timing signaling according to a time interval length between the first real system frame information and the first reference system frame information, if the first real system frame information is inconsistent with the first reference system frame information; and
discarding the subsequent timing signaling and waiting to receive a further subsequent timing signaling, or adjusting the second absolute time in the subsequent timing signaling according to a time interval length between the second real system frame information and the second reference system frame information, if the second real system frame information is inconsistent with the second reference system frame information.

5. The method according to claim 1, wherein:
the first time delay is determined using the following formula: first time delay=terminal reference time−first absolute time−uplink time advance value−hardware processing delay, wherein: the uplink time advance value is determined based on a final time advance value; the hardware processing delay is related to the delay in transmitting and/or processing the first timing signaling within the terminal; and the terminal reference time is zero or is terminal local time; and/or
the time delay adjustment value is determined using the following formula: time delay adjustment value=terminal reference time−first time delay−second absolute time−uplink time advance value−hardware processing delay, wherein, the terminal reference time is zero or local time of the terminal; and/or
the absolute time information comprises a third absolute time, which is determined using the following formula: third absolute time=Σ time delay adjustment value I/target number+first time delay, wherein: the time delay adjustment value i is the time delay adjustment value corresponding to the i-th subsequent timing signaling; and the value of i ranges from 1 to the target number.

6. The method according to claim 1, wherein, after determining the time delay adjustment value between the subsequent timing signaling and the first timing signaling at least based on the first time delay and the second absolute time, the method further comprising:
determining a processing manner of the time delay adjustment value of the subsequent timing signaling based on a current state of a virtual state machine and whether the time delay adjustment value of the subsequent timing signaling is less than a first jitter threshold and/or a second jitter threshold,
wherein:
the virtual state machine includes an initial state, a first state and a second state;
the virtual state machine is in the initial state at startup;
in the initial state, the received timing signaling is processed as the first timing signaling, and after processing the first timing signaling, the virtual state machine enters the first state;
in the first state, after receiving a subsequent timing signaling, the virtual state machine enters the second state;
in the second state, if the time delay adjustment value of the currently received subsequent timing signaling is greater than or equal to the second jitter threshold, the subsequent timing signaling is discarded and the virtual state machine transfers to the first state; and
in the first state, if the delay adjustment value of the discarded subsequent timing signaling is greater than or equal to the first jitter threshold, the virtual state machine enters the initial state.

7. A mobile terminal, comprising: a baseband processing chip and a timing chip, wherein:
the baseband processing chip receives a timing signaling from a base station via an air interface, and forwards to a timing chip the received timing signaling as well as a real system frame information used by the base station for transmitting the timing signaling to the terminal;
the baseband processing chip receives a current time advance value from the base station, and forwards the current time advance value to the timing chip
based at least on the timing signaling received from the baseband processing chip, the real system frame information and the current time advance value, the timing chip outputs an absolute time information for the terminal to synchronize time of the terminal to time of the base station, wherein, the timing chip determines the absolute time information using the methods according to claim 1.

8. A method of absolute time synchronization, wherein, the method is executed on a timing chip of a terminal in a mobile network, the method comprising:
performing a first timing signaling processing step, comprising receiving, from a baseband processing chip, a first timing signaling and a first real system frame information used by a base station for transmitting the first timing signaling to the terminal, wherein the first timing signaling comprises a first absolute time corresponding to local time of the base station at time of transmission of the first timing signaling and a first reference system frame information used by the base station for transmitting the first timing signaling;
calculating an initial time delay adjustment value between the base station and the terminal based on at least the first absolute time, if the first real system frame information is consistent with the first reference system frame information;
starting a virtual state machine, which enters an initial state of the virtual state machine; wherein, in the initial state, a first time delay between the base station and the terminal is determined as the initial time delay adjustment value, a total time delay adjustment value is set to 0, and then the virtual state machine enters a first state;
performing a subsequent timing signaling processing step, comprising: receiving, from the baseband processing chip, a subsequent timing signaling and a second real system frame information used by the base station for transmitting the subsequent timing signaling, wherein the subsequent timing signaling comprises a second absolute time corresponding to the local time of the base station at time of transmission of the subsequent timing signaling, and a second reference system frame information used by the base station for transmitting the subsequent timing signaling;
determining a time delay adjustment value between the subsequent timing signaling and the first timing signaling based on at least the first time delay and the second absolute time, if the second real system frame information is consistent with the second reference system frame information;
adding 1 to a number of the received subsequent timing signalings, and enabling the virtual state machine to move from the current state to a second state, the current states comprising the first or the second state;
wherein:
in the second state, if the time delay adjustment value of the subsequent timing signaling is greater than or equal to the second jitter threshold, the number of the subsequent timing signalings is decreased by 1 and the current state of the virtual state machine moves from the second state to the first state;
after moving from the second state to the first state, if the time delay adjustment value of the subsequent timing signaling is greater than or equal to the first jitter threshold, the number of the subsequent timing signalings is reset to 0, the first time delay is reset to 0, and the current state of the virtual state machine moves from the first state to the initial state, first timing signaling processing step is performed;
on the other hand, after moving from the second state to the first state, if the time delay adjustment value of the subsequent timing signaling is less than the first jitter threshold, the total time delay adjustment value is increased by a weighted value of the time delay adjustment value, which is less than the time delay adjustment value, and if the number of subsequent timing signaling is less than a target number, the subsequent timing signaling processing step is performed, and if the number of the subsequent timing signaling is equal to the target number, an absolute time information outputting step is performed; and
in the second state, if the time delay adjustment value of the subsequent timing signaling is less than the second jitter threshold, the total time delay adjustment value is increased by the time delay adjustment value of the subsequent timing signaling, and the number of the subsequent timing signalings is increased by 1, and if the number of the subsequent timing signalings is less than the target number, the subsequent timing signaling processing step is performed, and if the number of the subsequent timing signalings is equal to the target number, the absolute time information outputting step is performed;
the absolute time information outputting step comprises: determining an absolute time information based on the total time delay adjustment value, the number of the subsequent timing signalings and the first time delay and outputting the absolute time information, which is used to synchronize the time of terminal to time of the base station.

* * * * *